Feb. 13, 1934.   O. F. CARLSON   1,947,123
HARVESTER FINGER BAR
Filed Aug. 29, 1932
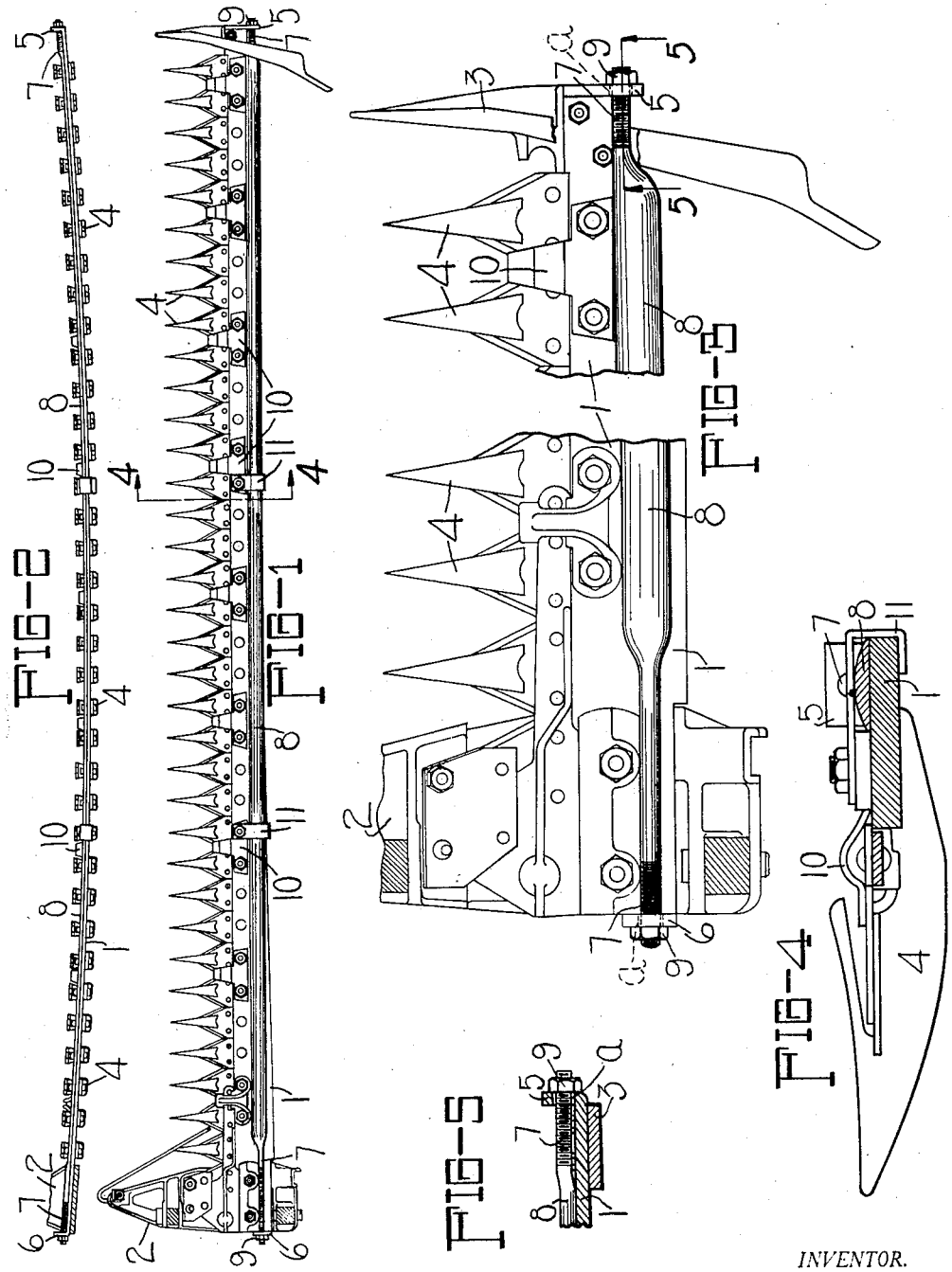
INVENTOR.
OSCAR F. CARLSON.
BY W. C. Jirdinston
ATTORNEY.

Feb. 13, 1934

1,947,123

UNITED STATES PATENT OFFICE 1,947,123

HARVESTER FINGER BAR

Oscar F. Carlson, Moline, Ill., assignor to Deere & Company, Moline, Ill., a corporation of Illinois Application August 29, 1932. Serial No. 630,849

1 Claim. (Cl. 56—307)

My invention relates to mowers and particularly to the cutting mechanism, and has for its object to provide an improvement for the finger bar whereby flexing strain of the bar is effectively controlled.

Referring to the drawing in which similar numerals indicate identical parts—

Figure 1 is a plan view of a complete mower bar showing my improvement;

Figure 2 is a rear view of Figure 1;

Figure 3 is an enlarged broken plan view showing both ends of Figure 1 and illustrating more clearly my invention;

Figure 4 is an enlarged section on the line 4—4 of Figure 1; and,

Figure 5 is a detail section on the line 5—5 of Figure 3.

The finger bar 1 is made of steel rolled flat and of uniform thickness having its greater width at the inner shoe 2 to which it is secured, the width decreasing grasswardly to the outer shoe 3. Guard fingers 4 are mounted on the front side of the finger bar, and the inner end of the bar is connected with the usual lifting and tilting mechanism, not shown.

When the finger bar is raised from operation, whether to clear an obstacle, or for other purposes, it will sag because of its flexibility and the weight of the outer shoe 3, consequently when the bar is lowered the outer shoe will rest upon the ground before the full length of the bar is in operative position.

The object of my invention is to condition the finger bar so that the flexibility, due to the standard light construction of the bar and the weight of the outer shoe, will be materially lessened and sufficient stiffness imparted to add to the longevity and the efficiency of the bar in operation.

At the grassward end of the bar 1 is an upwardly extending bracket 5 and a similar bracket 6 is at the stubbleward end of the bar, both brackets, in this instance, are integral with the bar 1 but they can be made separately therefrom and welded or otherwise secured to the bar 1. Both of the brackets have holes $a$ as shown in Figure 5 to receive the ends 7 of a tension bar 8; the ends 7 are drawn or reduced and rounded to project freely through the holes and are threaded to receive nuts 9 on the outside of the brackets 5 and 6. The under side of the tension bar 8 is flat to rest snugly on the bar 1 and rearward of the clips 10 which are secured on the bar 1 by suitable bolts and operate to hold the knife bar in operative position as usual. The upper side of the bar 8 is arcuate in cross section, as shown more clearly in Figure 4, to permit free passage of the cut grass thereover without danger of clogging. The bar 8 is further held on the finger bar 1 by holders 11 formed from a flat bar and secured to adjacent clips 10 by the same bolts which hold the clips to the finger bar. The holders extend rearwardly over the bar 8 and are bent downwardly rearwardly of the finger bar 1, in contact therewith, and are turned under the finger bar 1 as clearly shown in Figure 4, the clips holding the bar 8 in position on the upper side of the finger bar, without preventing longitudinal adjustment of the bar 8 in regulating the tension thereof.

It will be noted the line of strain of the bar 8 is above the plane of the finger bar 1, consequently when the nuts 9 are tightened the strain will tend to overcome any tendency of the finger bar to sag when raised, and it is also evident that by adjustment of the nuts 10 the strain can be so controlled as to preserve that rigidity so desirable in the finger bar of a harvester.

What I claim is—

The combination with a harvester finger bar, of a tension rod on the upper side of said bar, means connecting the ends of said bar to the ends of said rod, said connecting means including means for adjusting the tension in said rod whereby the outer end of said bar may be caused to curve upwardly relatively to the inner end and the degree of such upward curvature varied, and one or more brackets on said bar contacting said rod to hold the latter in close proximity to said bar meanwhile permitting even distribution of strain in said rod when the tension thereof is adjusted.

OSCAR F. CARLSON.